United States Patent
Zander et al.

(10) Patent No.: US 8,648,916 B2
(45) Date of Patent: Feb. 11, 2014

(54) CONTROL OF AN IMAGE CAPTURING DEVICE

(71) Applicant: Axis AB, Lund (SE)

(72) Inventors: Per Zander, Lund (SE); Mats Thulin, Strandbaden (SE)

(73) Assignee: Axis AB, Lund (SE)

( * ) Notice: Subject to any disclaimer, the term of this patent is extended or adjusted under 35 U.S.C. 154(b) by 0 days.

(21) Appl. No.: 13/908,281

(22) Filed: Jun. 3, 2013

(65) Prior Publication Data

US 2013/0321670 A1 Dec. 5, 2013

Related U.S. Application Data

(60) Provisional application No. 61/656,786, filed on Jun. 7, 2012.

(30) Foreign Application Priority Data

Jun. 5, 2012 (EP) ..................................... 12170820

(51) Int. Cl.
*H04N 5/225* (2006.01)
*H04N 9/04* (2006.01)
*H04N 5/232* (2006.01)
*H04N 5/222* (2006.01)

(52) U.S. Cl.
USPC .............. 348/207.99; 348/207.11; 348/211.8; 348/211.9; 348/333.01

(58) Field of Classification Search
None
See application file for complete search history.

(56) References Cited

U.S. PATENT DOCUMENTS

| | | | |
|---|---|---|---|
| 6,008,837 A | 12/1999 | Yonezawa | |
| 6,266,085 B1 | 7/2001 | Kato et al. | |
| 6,822,676 B1 | 11/2004 | Kurosawa et al. | |
| 7,643,064 B1 | 1/2010 | Jouppi | |
| 7,936,319 B2 | 5/2011 | Lipscomb | |
| 2001/0019355 A1 | 9/2001 | Koyanagi et al. | |
| 2006/0175549 A1* | 8/2006 | Miller et al. | 250/334 |
| 2006/0222209 A1* | 10/2006 | Zhang et al. | 382/107 |
| 2008/0297586 A1* | 12/2008 | Kurtz et al. | 348/14.08 |

FOREIGN PATENT DOCUMENTS

EP 1 560 160 A2 3/2005

OTHER PUBLICATIONS

European Search Report mailed on Oct. 22, 2012, issued for European Application No. 12170820.0, filed on Jun. 5, 2012 (English).

* cited by examiner

*Primary Examiner* — Justin P Misleh
(74) *Attorney, Agent, or Firm* — Oblon, Spivak, McClelland, Maier & Neustadt, L.L.P.

(57) ABSTRACT

There is provided a method, a system and a device for displaying an image corresponding to a first field of view to an operator of an image capturing device. The method comprises receiving input data relating to a change in at least one of a position, an orientation, or a scaling of the first field of view and determining, based on the input data, at least one of a position, an orientation or a scaling of the first field of view with respect to a second field of view which is larger than the first field of view. Further, the method comprises receiving an image captured by the image capturing device and determining an overlapping portion of the first field of view and the received image. An image to be displayed is then determined by using image data of the received image in the overlapping portion, and using image data of the second field of view in the non-overlapping portion. The invention is advantageous in that it provides an improved operation of the image capturing device.

15 Claims, 5 Drawing Sheets

CONTROL OF AN IMAGE CAPTURING DEVICE

CROSS-REFERENCE TO THE RELATED APPLICATION

The present application claims the benefit of the earlier filing date of U.S. Provisional Patent Application Ser. No. 61/656,786, filed on Jun. 7, 2012, and EP Application No. 12170820.0, filed on Jun. 5, 2012, the contents of each of which being incorporated herein by reference.

TECHNICAL FIELD

The present invention relates to the field of operation of an image capturing device.

BACKGROUND

Cameras having pan, tilt and zoom functionality are commonly used for surveillance purposes. Such cameras are typically connected, via a network, to a client device serving as a software or a hardware interface by which an operator is able to control the movement of the camera.

Due to latencies in the network, in the camera or in the client device, there will be a time delay from the time when the camera control is performed up to the time when a camera-controlled image arrives. That is, it takes time until an image reflecting the operator's control command may be shown to the operator. Since the images shown to the operator are lagging, it becomes difficult to control the pan/tilt/zoom movements. This problem becomes more severe when the speed of the pan/tilt/zoom movement is increased.

U.S. Pat. No. 6,822,676 addresses this problem in the context of zoom control. As a zoom-in control command is received, electronic zoom processing is performed in the last image received from the camera, and the electronically zoomed image is shown to the operator. When a predetermined time has elapsed, the displayed image is changed from the image undergoing electronic zoom processing to a new image transmitted from the camera.

However, a drawback of this approach is that it is limited to zoom-in. A further drawback is that the operator has to wait until he/she is presented with new image data. There is thus a need for improvements.

SUMMARY OF THE INVENTION

In view of the above, it is thus an object of the present invention to overcome or at least mitigate the above-mentioned drawbacks and to provide an improved method, device, and system for mitigating the negative effects of latencies in the control of an image capturing device.

According to a first aspect of the invention, there is provided a method for displaying an image corresponding to a first field of view to an operator of an image capturing device having at least one of a pan, a tilt, and a zoom functionality. The method comprises: receiving input data relating to a first operation command, the first operation command relating to a change in at least one of a position, an orientation, or a scaling of the first field of view, determining based on the input data at least one of a position, an orientation, or a scaling of the first field of view with respect to a second field of view which is larger than the first field of view, receiving an image captured by the image capturing device, and determining an overlapping portion of the first field of view and the image captured by the image capturing device. The method further comprises determining an image to be displayed by using image data of the image captured by the image capturing device in the overlapping portion, and accessing image data of the second field of view, and using image data of the second field of view in the portion of the first field of view falling outside of the overlapping portion. The method further comprises displaying the determined image to the operator and transmitting a second operation command relating to the first operation command to the image capturing device.

The term "first field of view" is to be interpreted as the image area of the image to be shown on the display. Typically, the image area has a rectangular shape.

The term "first operation command" is to be interpreted as an instruction as to how the position, the orientation and/or the scaling of the first field of view is to be changed. For example, the instruction may relate to coordinates of a target position of the first field of view, a target rotation angle of the first field of view, or a target scaling value of the first field of view, such as a target zoom-in or zoom-out value. Alternatively, the instruction may relate to a movement speed and a movement direction of the first field of view, such as a speed and direction of a translational movement of the first field of view, a rotational speed and direction of the first field of view, or a zooming speed and zooming direction of the first field of view.

The "position of the first field of view" may be defined with respect to some predefined coordinate system. For example, the position may refer to the coordinates of a point, such as a center point or a corner point, of the first field of view with respect to the predefined coordinate system. Similarly, the "orientation of the first field of view" may be defined with respect to some predefined direction. Likewise, the "scaling of the first field of view" may be defined with respect to some reference scaling value.

The term "second field of view" is to be interpreted as an image area which is larger than the image area corresponding to the first field of view. Typically, but not necessarily, the second field of view covers the first field of view. For example, the second field of view may correspond to the total field of view of the image capturing device.

The term "second operation command" is to be interpreted as an instruction comprising information relating to a desired movement of the image capturing device. The second operation command may for example relate to a desired pan/tilt/zoom position or a desired pan/tilt/zoom movement speed and movement direction. Alternatively, the second operation command may relate to a change in position, orientation or scaling of images captured by the image capturing device. The second operation command relates to the first operation command. In some embodiments the second operation command is equal to the first operation command. In other embodiments the second operation command may be determined based on the first operation command. The second operation command may also be determined based on a history of first operation commands, i.e. on first operation commands that have been input during a certain period of time.

By an "overlapping portion of the first field of view and the image captured by the image capturing device" is meant a common portion of the image area corresponding to the first field of view and the image area of the image received from the image capturing device.

By "image data of the second field of view" is generally meant data which represents a scene comprised in the second field of view. In some embodiments, the image data of the second field of view corresponds to image data covering at least parts of the second field of view captured by an image capturing device. In other embodiments, the image data may be rendered from a geometrical model of the scene.

At the time point when the method is performed an image fully reflecting the operator's desired operation of the image capturing device is not yet available due to latencies. More specifically, the image area covered by the image received from the image capturing device does not reflect the operator's desired field of view. In order to deal with this problem, the method displays an image to the operator which corresponds to a first field of view which is positioned, oriented and scaled such that it agrees with the operator's desired operation as defined by the first operation command. In this way, there is no lag in the image shown to the operator and hence the operator experiences that he/she has a more precise control of the movements of the image capturing device.

The displayed image is composed of data which is currently available. The currently available data is at least partly in the form of image data currently received from the image capturing device. Specifically, the displayed image, in the portion overlapping with the image received from the image capturing device, is determined based on image data from the received image. Thus, image data currently received from the image capturing device is displayed to the operator as soon as possible such that the operator does not have to wait for the displayed image to comprise current image information.

Further, the method uses accessible image data from the second field of view in the non-overlapping portion. For example the image data of the second field of view may correspond to a previously received image covering a larger area than the image to be displayed. In this way, by having image data of a second field of view being larger than the displayed first field of view, there will be available image data covering at least parts of the non-overlapping portion of the first field of view.

In some embodiments, image data of the second field of view is only accessed in case there is a portion of the first field of view falling outside of the overlapping portion. The method may thus further comprise checking if there is a portion of the first field of view falling outside of the overlapping portion.

There are a number of options as how to determine the image data of the second field of view. In one embodiment the image data of the second field of view has been captured by the image capturing device or by another, separate, image capturing device. For example, the image data of the second field of view may correspond to a pre-recorded image which is updated from time to time. The image data of the second field of view may be received directly from an image capturing device or may be accessed from a memory.

In one embodiment, the image data of the second field of view has been rendered from a geometrical model of a scene. For this purpose, the method may comprise rendering the image data of the second field of view based on a geometrical model of a scene. The rendered image data of the second field of view may for example be accessed from a memory where it has been temporarily stored. The geometrical model of the scene typically comprises information which enables an image of the scene to be rendered. This is advantageous in that it allows the image data of the second field of view to be generated without relying on receiving image data relating to the second field of view from an image capturing device.

The method may further comprise accessing a time delay relating to latencies in a system for displaying an image to the operator of the image capturing device, and determining the second operation command based on the input data and the time delay. For example, there may be latencies in the transmission of signals between different parts of the system, such as between an operation input device and the image capturing device, there may be latencies in the network to which the image capturing device is connected, there may be latencies in the mechanics of the image capturing device, and there may be latencies in the coding of the image capturing device and in other parts of the system. The time delay typically relates to the time delay from the moment the second operation command is sent to the image capturing device until the moment the image capturing device may deliver an image reflecting the instruction of the second operation command. The time delay may be an estimated time delay. The time delay may be a measured time delay. The time delay may for example be accessed from a memory or may be received via a user input.

Based on the input data, that is, the operator's desired change in position, orientation and/or scaling of the displayed field of view, and the time delay, an expected movement of the image capturing device may be estimated. If the expected movement differs from the desired movement as expressed by the input data, a second operation command being an adjustment of the first operation command may be determined. For example, if there is a lag between the desired movement and the expected movement, the second operation command may instruct the image capturing device to move more rapidly in order to decrease the lag.

This is thus advantageous in that the control of the image capturing device may be adjusted such that the influences of the time delay are further reduced.

Preferably, the second operation command relates to at least one of a target position, a target orientation, or a target scaling of images captured by the image capturing device. This is advantageous in that it is easy and flexible to use. Also, by using such target values one does not have to take accumulated errors into account. Alternatively, the second operation command may relate to a target value of at least one of a pan position, a tilt position, and a zoom position. Alternatively, or additionally, the second operation command may relate to a movement speed and a movement direction of the image capturing device. For example, the second operation command may relate to a movement speed and a movement direction of at least one of a pan movement, a tilt movement, and a zoom movement.

The first operation command may relate to at least one of a target position, a target orientation, or a target scaling of the first field of view of the image to be displayed. For example the target position may be target coordinates of the center of the first field of view with respect to some coordinate system, the target orientation may be a target rotation angle with respect to some predefined direction, and the target scaling may be a target zoom-in value or a target zoom-out value.

Alternatively, or additionally, the first operation command may relate to a movement speed and a movement direction of the first field of view of the image to be displayed. For example, the first operation command may relate to a movement speed in an x-direction and a y-direction with respect to some x-y coordinate system, the first operation command may relate to a rotation speed in a clockwise or counter-clockwise direction, and/or the first operation command may relate to a speed of zoom-in or zoom-out. This is for example advantageous in that the operator may provide input regarding how he/she wants the first field of view to move. The first operation command may for example be input via a joystick or via a graphical user interface as will be further explained below.

The method may further comprise determining at least one of a position, an orientation, or a scaling of the image captured by the image capturing device with respect to the second field of view. This is advantageous in that it simplifies comparison between the positions, orientations and/or scaling of the received image and the first field of view.

The act of determining an overlapping portion of the first field of view and the image captured by the image capturing device may comprise determining an offset in at least one of a position, an orientation, and a scaling between the first field of view and the image captured by the image capturing device. This is advantageous in that information regarding the relative position, the orientation and/or the scaling of the first field of view and the image captured by the image capturing device is obtained.

In one embodiment, the method comprises receiving information from the image capturing device relating to at least one of the position, the orientation, or the scaling of the image captured by the image capturing device. The received information may be used to determine the offset between the first field of view and the image captured by the image capturing device. The position of the image captured by the image capturing device may be given with respect to some coordinate system. The orientation may be given with respect to some reference direction. The scaling may be given with respect to some reference scaling value. This is advantageous in that it allows the offset between the first field of view and the image captured by the image capturing device to be computed in a simple and efficient manner.

In one embodiment, the method comprises receiving information relating to a movement speed and a movement direction of the image capturing device, and determining at least one of the position, the orientation, or the scaling of the image captured by the image capturing device based on the information relating to the movement speed and the movement direction of the image capturing device. The movement may relate to a pan/tilt/zoom movement. This is advantageous in that it allows the offset between the first field of view and the image captured by the image capturing device to be computed in a simple and efficient manner. This is particularly advantageous in case no information relating to at least one of the position, the orientation, or the scaling of the image captured by the image capturing device is available.

At least one of the position, the orientation, and the scaling of the image captured by the image capturing device with respect to the second field of view may be determined by performing a correlation between the image data of the second field of view and the image captured by the image capturing device. Optionally, the image data of the second field of view may be restricted to the first field of view when performing the correlation in order to reduce the processing power at expense of the precision of the result.

In one embodiment, this approach is used as a complement to the above approaches of receiving information from the image capturing device relating to at least one of the position, the orientation, or the scaling of the image captured by the image capturing device and/or receiving information relating to a movement speed and a movement direction of the image capturing device. In this way the accuracy of the determined position, orientation, and/or the scaling of the received image with respect to the second field of view may be improved. In another embodiment, this approach is used on its own without receiving any further information from the image capturing device. This is advantageous in that it allows the position, orientation, and/or the scaling of the received image with respect to the second field of view, and thereby the overlapping portion, to be determined without having access to any additional knowledge about the position, orientation, or scaling of the image captured by the image capturing device.

In one embodiment, the offset may be determined by estimating the motion of the image capturing device taking the time delay into account. In this way, the position of the image captured by the image capturing device may be estimated and the corresponding offset may easily be determined.

Preferably, the image data of the second field of view is updated from time to time. For example, the image data of the second field of view may be updated periodically. Particularly, the method may comprise updating the image data of the second field of view using the image captured by the image capturing device. For example, the image data of the second field of view corresponding to the image area of the image captured by the image capturing device may be updated using the image from the image capturing device. This is particularly advantageous in cases where a pan/tilt/zoom movement is slowed down or reversed in direction, since the first field of view then moves to areas of the second field of view which recently have been updated with new image data.

According to a second aspect of the invention there is provided a processing device for displaying an image corresponding to a first field of view to an operator of an image capturing device having at least one of a pan, a tilt, and a zoom functionality, the image capturing device being arranged to receive an operation command relating to a first operation command. The processing device comprises: a memory arranged to store image data of a second field of view, a receiver arranged to receive input data relating to a first operation command, the first operation command relating to a change in at least one of a position, an orientation, or a scaling of the first field of view of the image to be displayed, and to receive an image captured by the image capturing device, a processing unit arranged to determine based on the input data at least one of a position, an orientation, or a scaling of the first field of view with respect to a second field of view which is larger than the first field of view, to determine an overlapping portion of the first field of view and the image captured by the image capturing device, to determine an image to be displayed by using image data of the image captured by the image capturing device in the overlapping portion, and accessing image data of the second field of view from the memory, and using the image data of the second field of view in the portion of the first field of view falling outside of the overlapping portion. The processing device further comprises a transmitter arranged to transmit the determined image to a display.

According to a third aspect of the invention there is provided a system for displaying an image corresponding to a first field of view to an operator of an image capturing device, comprising: an operation input device arranged to receive input from the operator relating to a first operation command, the first operation command relating to a change in at least one of a position, an orientation, or a scaling of the first field of view, an image capturing device having at least one of a pan, a tilt, and a zoom functionality, the image capturing device being arranged to receive an operation command relating to the first operation command, a processing device according to the first aspect connected to the operation input device and the image capturing device, thereby being arranged to receive input data relating to the first operation command from the operation input device, and to receive an image captured by the image capturing device, and a display arranged to receive images from the processing device and to present the received images to the operator.

According to a fourth aspect of the invention there is provided a computer-readable recording medium having recorded thereon a program for implementing the method according to the first aspect when executed on a device having processing capabilities.

The second, third and fourth aspects may generally have the same features and advantages as the first aspect. It is further noted that the invention relates to all possible combinations of features unless explicitly stated otherwise.

Generally, all terms used in the claims are to be interpreted according to their ordinary meaning in the technical field, unless explicitly defined otherwise herein. All references to "a/an/the [device, event, message, alarm, parameter, step etc.]" are to be interpreted openly as referring to at least one instance of said device, event, message, alarm, parameter, step etc., unless explicitly stated otherwise. The steps of any method disclosed herein do not have to be performed in the exact order disclosed, unless explicitly stated.

BRIEF DESCRIPTION OF THE DRAWINGS

The above, as well as additional objects, features and advantages of the present invention, will be better understood through the following illustrative and non-limiting detailed description of preferred embodiments of the present invention, with reference to the appended drawings, where the same reference numerals will be used for similar elements, wherein.

DETAILED DESCRIPTION OF EMBODIMENTS

Figure 1:
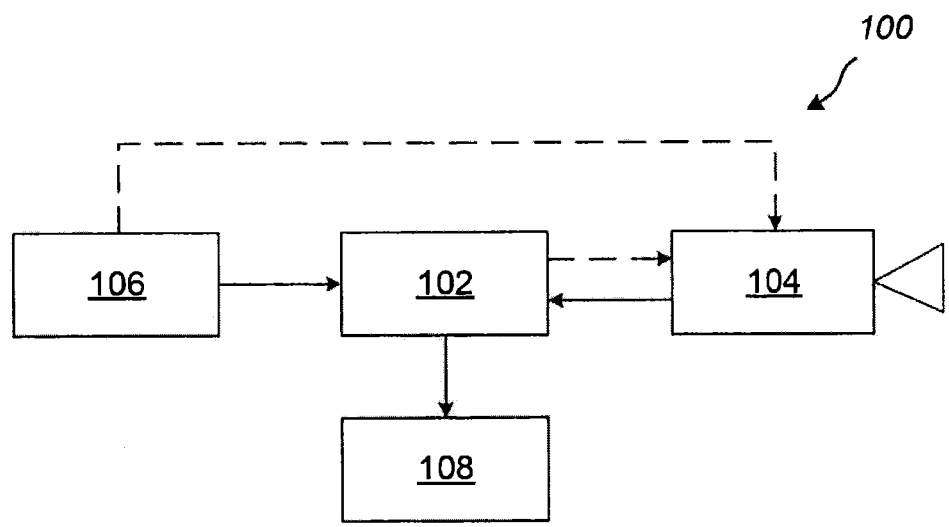
FIG. 1 is a schematic illustration of a system for displaying an image to an operator of an image capturing device according to embodiments of the invention.

FIG. 1 illustrates an embodiment of a system 100 for displaying images to an operator of an image capturing device 104. The system 100 will be described in an operating state. The system comprises a processing device 102 which is operatively connected to an image capturing device 104, an operation input device 106, and a display 108. The connections may be wired connections, wireless connections, or combinations thereof.

The processing device 102, together with the operation input device 106 and the display 108, serves as an interface via which an operator may control the image capturing device 104. The image capturing device 104, which may be part of a network of image capturing devices, may be controlled to capture images in a variety of directions. For example, the image capturing device 104 may be directed to capture images in directions within a half-sphere. For this purpose the image capturing device 104 may have at least one of a pan functionality, a tilt functionality, and a zoom functionality. The image capturing device 104 transmits images to the processing device 102 at a predetermined rate. The processing device 102 may process the received images and show them to the operator on the display 108.

An operator may via the operation input device 106 transmit operation commands to the processing device 102. The operation commands relate to how the operator wants to change the position, orientation and/or scaling of the field of view shown on the display 108. The operation commands may also be sent to the image capturing device 104, either directly from the operation input device 106 to the image capturing unit 104 or via the processing device 102 (as indicated by the dashed lines in FIG. 1).

The operation input device 106 may generally be any device known in the art which is suitable for input of such operation commands. For example, the operation input device 106 may be a joystick, a keyboard, an eye motion sensor, a head motion sensor, a foot pedal, a touchscreen, voice control etc. For example, the operation input device 106 may be a mouse by which the operator via a graphical user interface may input operation commands.

In systems of the type illustrated in FIG. 1 there are typically latencies present. For example, there may be latencies in the transmission of signals between the operation input device 106 and the image capturing device 104, there may be latencies in the network, there may be latencies in the mechanics of the image capturing device 104, and there may be latencies in the coding of the image capturing device 104 and in the processing device 102. As a result, there is a delay between the moment the operator affects the operation input device 106 to give an operation command until the moment an image from the image capturing device 104 reflecting the operator's input may be shown on the display 108. This delay is quite disturbing for an operator and makes it difficult to operate the image capturing device 104 to a satisfactorily degree. By the present invention, as further disclosed in the following, the negative effects of such delays are reduced, thereby giving the operator an improved control of the image capturing device 104.

The image presented to the operator on the display 108 corresponds to a first field of view. During operation, the operation input device 106 receives a first operation command from the operator of the image capturing device 104. The operation input device 106 transmits input data relating to the first operation command to the processing device 102. The first operation command relates to the first field of view which the operator wants to be shown on the display 108. Particularly, the first operation command may relate to a change in position, orientation and/or scaling of the first field of view. The first operation command hence relates to translational movements, rotational movements and zooming of the first field of view. Thus, the first operation command may comprise instructions on how the position, the orientation, and/or the scaling of the first field of view is to be changed. For example, the first operation command may relate to a target position, a target orientation, or a target scaling of the first field of view. Alternatively, the first operation command may relate to a desired movement speed and movement direction of the first field of view, such as a speed of a translational movement, a rotational movement, and/or a scaling movement. The target position and the direction of movement may be defined with respect to some coordinate system known to the processing device 102. The target orientation may be defined as a target angle with respect to some predefined direction known to the processing device 102. Further, the target scaling value may be defined with respect to some reference scaling value known to the processing device 102. Consequently, the input data received by the processing device 102 may comprise coordinates of a target position of the first field of view, a target angle of the first field of view, and/or a target scaling value of the first field of view. Further, the input data received by the processing device 102 may comprise a movement speed and direction of a desired motion of the first field of view. This is further illustrated in FIG. 3a which is an example where an operator inputs a first operation command relating to a change in position of the first field of view. Corresponding examples relating to a change in orientation or in scaling will be described later with reference to FIGS. 4-5. It is understood that these examples may be combined.

Figure 3A:
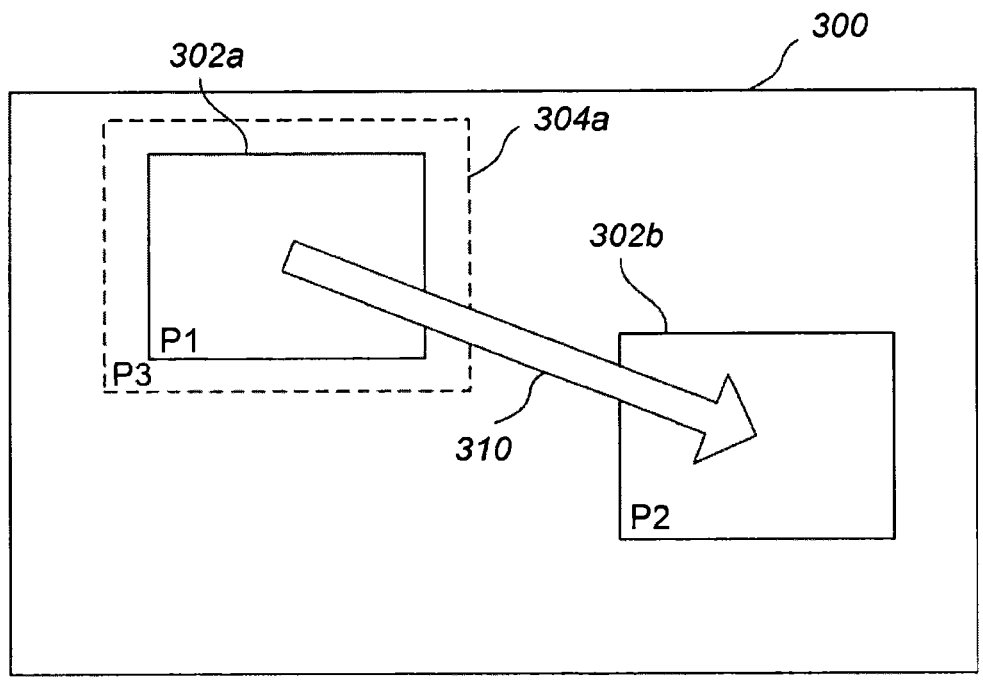
FIGS. 3a-5b are schematic illustrations of how an image corresponding to a first field of view is determined based on image data of a second field of view and an image received from an image capturing device according to embodiments of the invention.

In FIG. 3a a second field of view 300 is illustrated. As further disclosed below, the processing device 102 has access to image data of the second field of view 300. FIG. 3a further illustrates a first field of view 302a being positioned at a first position P1 within the second field of view 300. The first field of view 302a located at the first position P1 may correspond to a current image shown on the display 108. The second field of view 300 covers a larger area than the first field of view 302a. For example, the second field of view 300 may correspond to the total field of view of which the image capturing device 104 may capture images.

In the illustrated example, the input data received by the processing device 102 relates to a change in the position P1 of the first field of view 302a as illustrated by the arrow 310. Particularly, the input data may relate to the first field of view 302a in the first position P1 moving to a second position P2. This is illustrated by the first field of view 302b located at the second position P2. For example, the input data may relate to a target position of the first field of view 302b. The target position may be given in terms of coordinates of a point, such as a center point, of the first field of view 302b. Alternatively, the input data may relate to a movement speed and a movement direction of a desired movement of the first field of view 302a. For example, the movement speed may be given for two predefined directions, such as an x-direction and a y-direction with respect to some x-y coordinate system.

FIG. 3a further illustrates a field of view 304a of the image capturing device 104. The field of view 304a corresponds to a current field of view of the image capturing device 104 at the outset. In the illustrated example, the field of view 304a of the image capturing device 104 is centered about the first field of view 304a. However, in general this need not be the case. In other words, the first field of view of the image shown on the display 108 does not necessarily correspond to the field of view of the image capturing device 104.

Upon receipt of the input data, the processing device 102 determines, based on the input data, the position P2 of the first field of view 302b within the second field of view 300. In case the input data relates to a target position, the determined position P2 is equal to the target position. In case the input data relates to a movement speed and a movement direction, the position may be determined based on the movement speed, the movement direction and the time interval at which images are displayed on the display 108. In the illustrated example, the time interval corresponds to the time that elapses between the display of the first field of view 302a in the first position P1 and the display of the first field of view 302b in the second position P2.

Figure 3B:
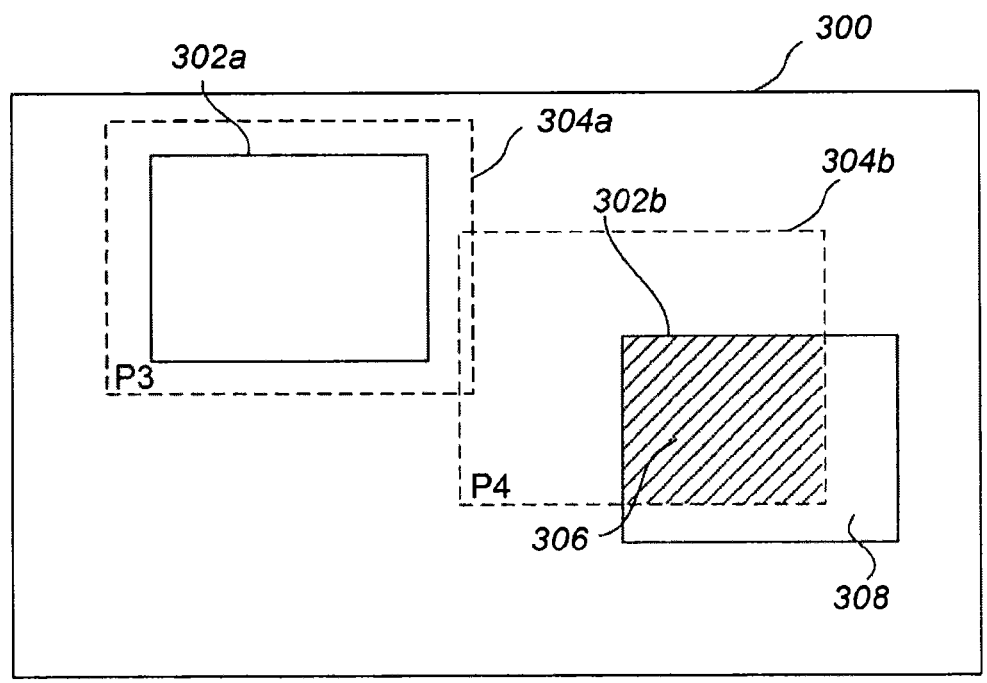

The processing device 102 constantly receives images from the image capturing device 104. Particularly, the processing device 102 receives an image from the image capturing device 104 at a time when an image corresponding to the first field of view 302b at position P2 is to be shown on the display 108. FIG. 3b illustrates an image 304b received at that time from the image capturing device 104. Ideally, the received image 304b should be centered about the first field of view 302b, meaning that there is no lag in position between the received image 304b and the first field of view 302b that will be shown on the display. However, and as illustrated in FIG. 3b, the received image is typically not centered about the first field of view 302b because of the latencies in the system 100. Specifically, in FIG. 3b the image 304b is positioned at a position P4 being different than the position P2. Thus, because of the latencies, the image capturing device 104 cannot yet transmit an image reflecting the desired change in position of the first field of view 302a-b.

In order to address this problem, the processing device 102 proceeds to determine an overlapping portion 306 of the first field of view 302b and the image 304b received from the image capturing device 104. The determination of the overlapping portion may comprise determining a position of the image 304b received from the image capturing device 104. Further, an offset, i.e. a relative position, between the position of the first field of view 302b and the image 304b received from the image capturing device 104 may be determined. For example, an offset between the center points or any other predefined points, such as the positions P2 and P4, of the first field of view 302b and the received image 304b may be determined.

In one embodiment the processing device 102 receives information, such as metadata, from the image capturing device 104 together with the image 304b. The information may relate to the position P4 of the image 304b captured by the image capturing device 104. Based on the received information, the processing device 102 may determine the offset as the difference between the position P4 of the image 304b and the position P2 of the first field of view 302b.

Alternatively, or additionally, the information may comprise information relating to the movement speed and the movement direction of the image capturing device 104 at the time the image 304b was captured. Based on the received information, the processing device 102 may determine, or at least estimate, the position P4 of the received image 304b. In particular, the position P4, may be estimated based on the position of a previously received image, such as the position P3 of the image 304a, the time that has lapsed since the previously received image was captured, and the information relating to the movement speed and the movement direction of the image capturing device 104.

Alternatively, or additionally, the processing device 102 determines the offset between the first field of view 302b and the received image 304b by image correlation. In more detail, the processing device 102 may correlate image data of the second field of view 300 with the received image 304b in order to determine the position P4 of the received image 304b. Optionally, the image data of the second field of view may be restricted to the first field of view prior to performing the correlation in order to save processing resources. The correlation may be performed in any known manner. By combining the above approach of using metadata in order to determine the offset with the image correlation approach, a further refinement of the determination of the offset is obtained.

In another embodiment, the processing device 102 estimates the position P4 of the received image 304b based on the operation command(s) which has been sent to the image capturing device 104 and the time delay of the system 100. More precisely, the processing device 102 has knowledge about which operation commands has been sent to the image capturing device 104 and may therefore estimate the movement of the image capturing device 104 once the time delay is known. In case the operation command which has been sent to the image capturing device 104 is equal to the first operation command, which for example may be the case if the operation input device 106 directly transmits operation commands to the image capturing device 104, the processing device 102 may estimate the movement of the image capturing device 104 from the input data and the time delay.

Once the processing device 102 has determined the overlapping portion 306 between the first field of view 302b and the received image 304b, it proceeds to determine an image to be displayed on the display 108. The image to be displayed corresponds to the first field of view 302b at position P2. As illustrated in FIG. 3b, the first field of view 302b may comprise two portions—the overlapping portion 306, and a non-overlapping portion 308. The non-overlapping portion 308 may be seen as the portion of the first field of view falling outside of the overlapping portion 306. It is to be understood that there are cases when the received image 304b completely overlaps the first field of view 302b and hence where there is no non-overlapping portion.

Within the overlapping portion 306, the processing device 102 has, via the received image 304b, access to current image data captured by the image capturing device 104. Thus, the processing device 102 determines the image data of the overlapping portion 306 to correspond to image data from the corresponding portion 306 of the received image 304b.

Within the non-overlapping portion 308, the processing device 102 has not access to current image data from the image capturing device 104. Instead, the processing device 102 may access image data of the second field of view 300. The processing device 102 may then determine the image data of the non-overlapping portion 308 to correspond to image data of the corresponding portion 308 of the second field of view 300. Optionally, the image data of the non-overlapping portion 308 may be adjusted with respect to for example intensity, contrast and/or colour to match the corresponding parameters of the received image 304b.

The image data of the second field of view may comprise image data captured by an image capturing device. For example, the processing device 102 may access, from an internal memory, a pre-recorded image covering the whole or parts of the potential field of view of the image capturing device 104. The pre-recorded image may for example be captured by the image capturing device 104. In one embodiment, the image data of the second field of view 300 is composed of a plurality of sub-images which are arranged side-by-side or slightly overlapping to form the complete image data of the second field of view 300. For example, the sub-images may be generated by the image capturing device 104 by scanning the second field of view 300. Such scanning of the second field of view 300 may be performed at predefined time intervals. According to other embodiments, image data of the second field of view 300 may be received from the image capturing device 104 or from another, separate, image capturing device (not shown). If so, and in order to save bandwidth, the image data of the image captured by the image capturing device 104 of by the separate image capturing device outside of a predefined central portion of the image may be more compressed than the image data inside of the predefined central portion. This is particularly advantageous when the image is captured by the image capturing device 104 itself since the bandwidth in that case is more limited. According to one embodiment, the image capturing device 104 may capture the image data of the second field of view 300 by zooming out from its current zooming level, thereby causing the captured image to cover a wider field of view. Alternatively, the processing device 102 may render the image data of the second field of view 300 from a geometrical model of a scene. The rendered image data may be temporarily stored in an internal memory of the processing device. Further, the geometrical model may be stored in an internal memory of the processing device 102. The image data of the second field of view may also be a combination of image data captured by an image capturing device and image data rendered from geometrical model data.

In some embodiments, the image data of the second field of view 300 may be updated with the image 304b received from the image capturing device 104. More specifically, by using the image data of the received image 304b, the processing device 102 may update the image data of the second field of view 300 in the portion falling inside of the image 304b.

Having determined an image to be displayed, the processing device 102 transmits the image data to the display 108 such that it may be displayed to the operator in a conventional manner.

As discussed above, operation commands which are input at the operation input device 106 may be transmitted to the image capturing device 104. In particular, a second operation command related to the first operation command may be transmitted to the image capturing device 104.

In one embodiment, the second operation command is transmitted by the operation input device 106 directly to the image capturing device 104. If so, the second operation command is typically equal to the first operation command.

In another embodiment, the second operation command is transmitted by the processing device 102 to the image capturing device 104. If so, the second operation command may either be equal to the first operation command or may be determined by the processing device 102 based on the first operation command. Particularly, the second operation command may be determined by the processing unit 102 based on the input data and a time delay relating to latencies in the system 100. In this case, the processing device 102 may access a time delay, for example from an internal memory, and determine the second operation command on basis of the accessed time delay and the input data. In this way, the processing device 102 may estimate an ideal image position or a desired movement speed and direction of the image capturing device 104 based on the instructions received from the operator and by taking the latencies into account. For example, it may be the case that the image capturing device 104 needs to move more rapidly than what the operator has input at the operation input device 106 in order to compensate for the latencies in the system 100.

As an alternative, the second operation command may be based on the offset between the first field of view 302b and the image 304b received from the image capturing device 104. For example, if the offset is greater than a certain value, the processing device may send a second operation command instructing the image capturing device 104 to move more rapidly. For example, the second operation command may relate to a movement speed and a movement direction being a function of the offset. The movement speed of the second operation command may be proportional to the absolute value of the offset.

Another example relating to a change in orientation of the first field of view will now be described with reference to FIGS. 4a-b.

Figure 4A:
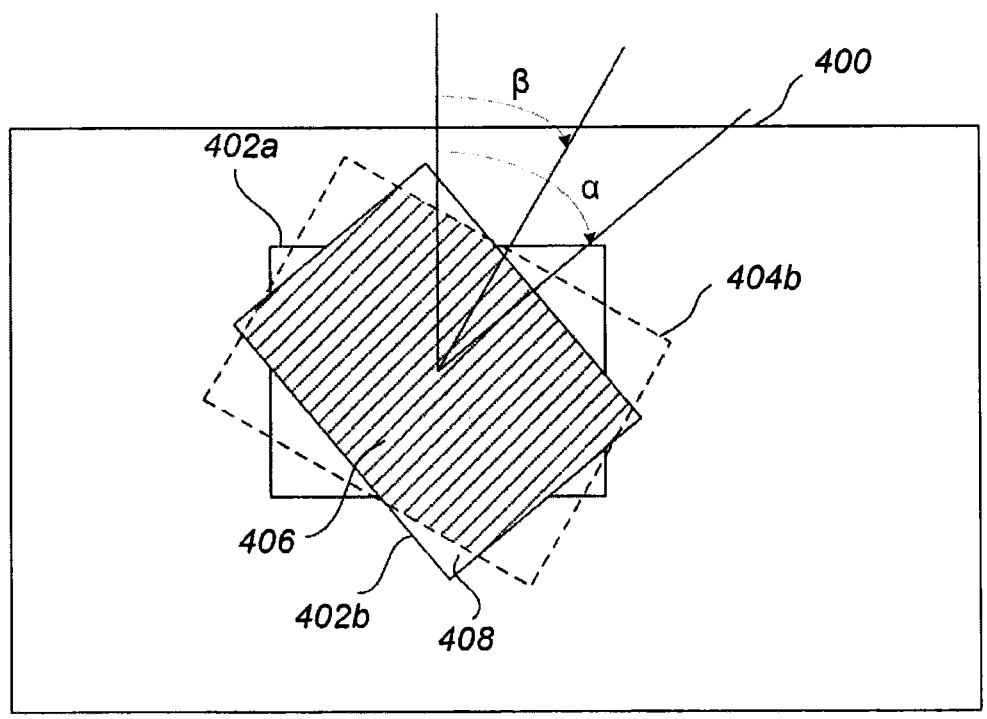

FIG. 4a illustrates a first field of view 402a which is positioned within a second field of view 400. In the illustrated example the first field of view 402a has the same orientation as the second field of view 400. However, in general, the first field of view 402a may have an arbitrary orientation with respect to the second field of view 400. An operator may input to the processing device 102 via the operation input device 106 that he wants to change the orientation of the first field of view 402a. The input data received by the processing device may for example relate to a target orientation, such as a target angle with respect to some predefined direction, or a desired angular speed and angular direction. Based on the input, the processing device 106 may determine a new orientation of the first field of view 402a with respect to the second field of view 400. The first field of view having the new orientation is illustrated by the first field of view 402b. In the example, the first field of view 402b is rotated with an angle α with respect to the second field of view. The angle α may be defined with respect to a predefined direction.

The processing device 102 further receives an image 404b captured by the image capturing device 104. Based on the received image 404b the processing device 102 proceeds to determine an overlapping portion 406 of the received image and the first field of view 402b. In order to do so, the processing device may determine the orientation of the received image 404b with respect to the second field of view 400. As further discussed with reference to FIGS. 3a-b such determination may for example be based on metadata sent to the processing device 102 together with the image 404b, and/or be based on image correlation techniques, and/or be based on an estimation of the movement of the image capturing device 104 taking the time delay into account. The metadata may for example comprise the orientation of the image 404b with respect to a predefined direction. Alternatively, the metadata may relate to an angular speed and direction of the image capturing device 104. In the illustrated example, the received image 404b is rotated by an angle β with respect to the second field of view 400. Thus, there is an angular offset between the first field of view 402b and the received image 404b of α-β.

Having knowledge about the angular orientations of the first field of view 402b and the received image 404b with respect to the second field of view 400, the processing device 102 may determine the overlapping portion 406 between the first field of view 402b and the received image 404b. Further, the processing device 102 may determine whether there is a non-overlapping portion 408 of the first field of view 402b, i.e., if there is a portion of the first field of view 402b falling outside of the overlapping portion 406.

In order to determine an image to be displayed, the processing device 102 uses image data of the received image 404b in the overlapping portion 406. Further, the processing device 102 accesses image data of the second field of view 400 and uses the accessed image data in the non-overlapping portion 408.

Figure 4B:
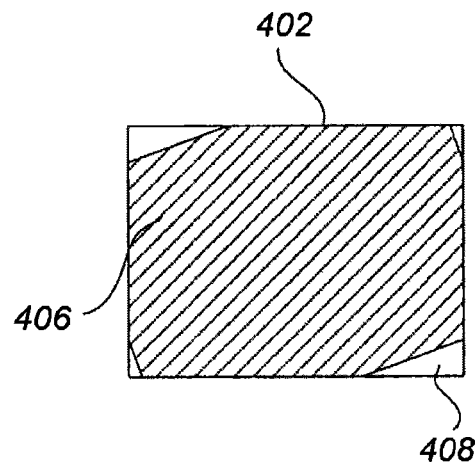

FIG. 4b illustrates the resulting image 402 which is shown on the display 108. When constructing the image 402 to be displayed care should be taken such that the respective rotations of the received image 404b and the first field of view 402b with respect to the second field of view 400 are taken into account. As disclosed above, the processing device 102 uses image data of the second field of view 400 in the non-overlapping portion 408. Since the image data has its origin in the second field of view 400 which is oriented at an angle of −α with respect to the first field of view 402b, it should be rotated by an angle of −α to fit into the image 402. Similarly, the processing device 102 uses image data of the received image 404b in the overlapping portion 406. Since the image data has its origin in the received image 404b which is oriented at an angle of −(α−β) with respect to the first field of view 404b, it should be rotated by an angle of −(α−β) to fit into the image 402.

Another example relating to a change in scaling of the first field of view will now be described with reference to FIGS. 5a-b.

Figure 5A:
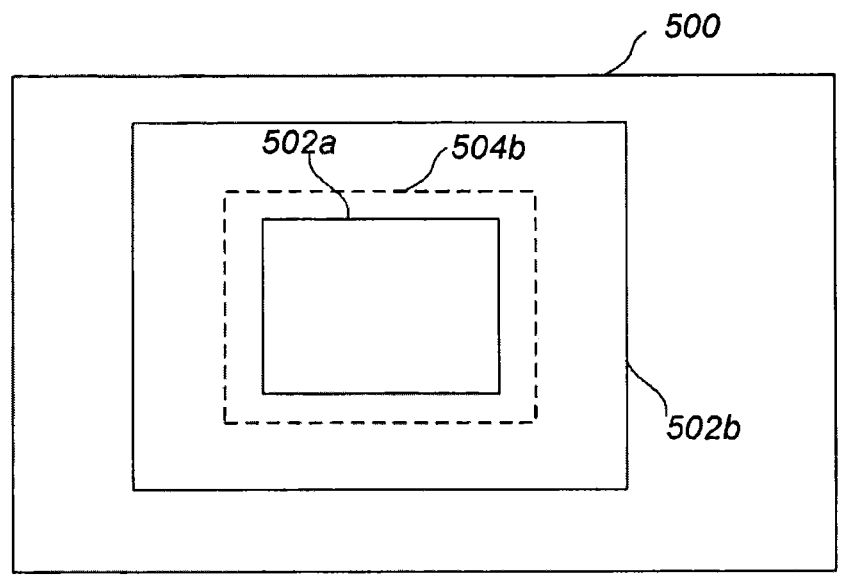
Figure 5B:
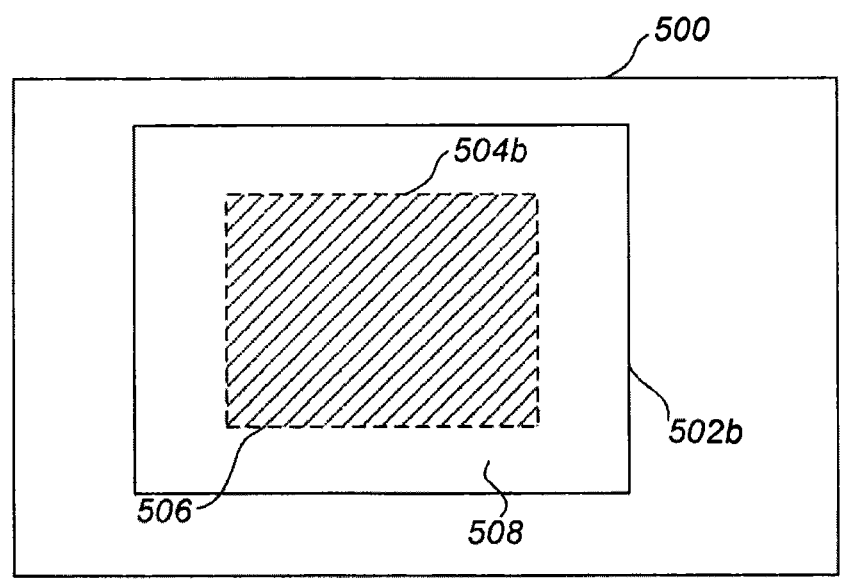

FIG. 5a illustrates a first field of view 502a which is positioned within a second field of view 500. An operator may input to the processing device 102 via the operation input device 106 that he wants to change the scaling of the first field of view 502a. For example the change in scaling may relate to a zoom-in or a zoom out. Based on the input, the processing device 106 may determine a new scaling of the first field of view 502a with respect to the second field of view 500. The scaling may for example be given in terms of a scaling factor. The input data received by the processing device may for example relate to a target scaling factor, such as a target scaling factor with respect to some predefined value, or a desired scaling speed and scaling direction, such as a zoom-in speed or a zoom-out speed. In the illustrated example the change in scaling relates to a zoom-out. The first field of view having the new scaling is illustrated by the first field of view 502b covering a larger image area than the first field of view 502a. It is emphasized that this is only for illustration purposes. In reality the size of the first field of view is constant, i.e., the size of the image shown on the display is constant, and the content of the image is scaled. In the example, the first field of view 502b is scaled with a factor K1 with respect to the second field of view 500.

The processing device 102 further receives an image 504b captured by the image capturing device 104. Based on the received image 504b the processing device 102 proceeds to determine an overlapping portion 506 of the received image and the first field of view 502b. In order to do so, the processing device may determine the scaling of the received image 504b with respect to the second field of view 500. As further discussed with reference to FIGS. 3a-b such determination may for example be based on metadata sent to the processing device 102 together with the image 504b and/or be based on image correlation techniques, and/or be based on an estimation of the movement of the image capturing device 104 taking the time delay into account. The metadata may for example comprise scaling factor of the image 504b with respect to a predefined reference scaling value. Alternatively, the metadata may relate to a zoom speed and zoom direction of the image capturing device 104. In the illustrated example, the received image 504b is scaled by a factor K2 with respect to the second field of view 500.

Having knowledge about the scaling factors K1 and K2 of the first field of view 502b and the received image 504b with respect to the second field of view 500, the processing device 102 may determine the overlapping portion 506 between the first field of view 502b and the received image 504b. This is illustrated in FIG. 5b. Further, the processing device 102 may determine whether there is a non-overlapping portion 508 of the first field of view 502b, i.e., if there is a portion of the first field of view 502b falling outside of the overlapping portion 506.

In order to determine an image to be displayed, the processing device 102 uses image data of the received image 504b in the overlapping portion 506. Further, the processing device 102 accesses image data of the second field of view 500 and uses the accessed image data in the non-overlapping portion 508.

When constructing the image to be displayed care should be taken such that the respective scaling of the received image 504b and the first field of view 502b with respect to the second field of view 500 are taken into account. As disclosed above, the processing device 102 uses image data of the second field of view 500 in the non-overlapping portion 508. Since the non-overlapping portion of image data has its origin in the second field of view 500 which is scaled by a factor of 1/K1 with respect to the first field of view 502b, it should be scaled by a factor of K1 to fit in the first field of view. Similarly, the processing device 102 uses image data of the received image 504b in the overlapping portion 506. Since the image data has its origin in the received image 504b which is scaled by a factor of K2/K1 with respect to the first field of view 502b, it should be scaled by a factor of K1/K2 to fit into the first field of view.

Figure 2:
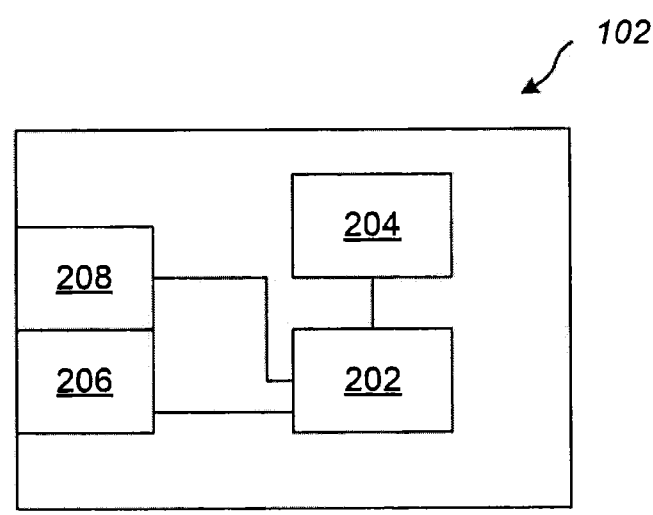
FIG. 2 is a schematic illustration of a device for displaying an image to an operator of an image capturing device according to embodiments of the invention.

The processing device 102 may be implemented in software or hardware. FIG. 2 illustrates internal parts of the processing device 102 according to an embodiment. The processing device 102 comprises a processing unit 202 which may be a central processing unit (CPU). The processing unit 202 is operatively connected to a memory 204, a receiver 206, and a transmitter 208. The receiver 206 is configured to receive data signals from external units, devices, and apparatuses in any known manner. For example, the receiver 202 may be configured to receive data from the operation input device 106 and the image capturing device 104. Likewise, the transmitter 208 is configured to transmit data signals to external units, devices, and apparatuses in any known manner. For example, the transmitter may be configured to transmit data to the display 108 and the image capturing device 104. The memory 204 may be configured to store software instructions pertaining to a computer-implemented method for displaying an image to an operator of the image capturing device 104. The memory 204 may thus form a computer-readable medium which may have stored thereon software instructions. The software instructions may cause the processing unit 202 to execute a method according to embodiments of the present invention.

Figure 6:
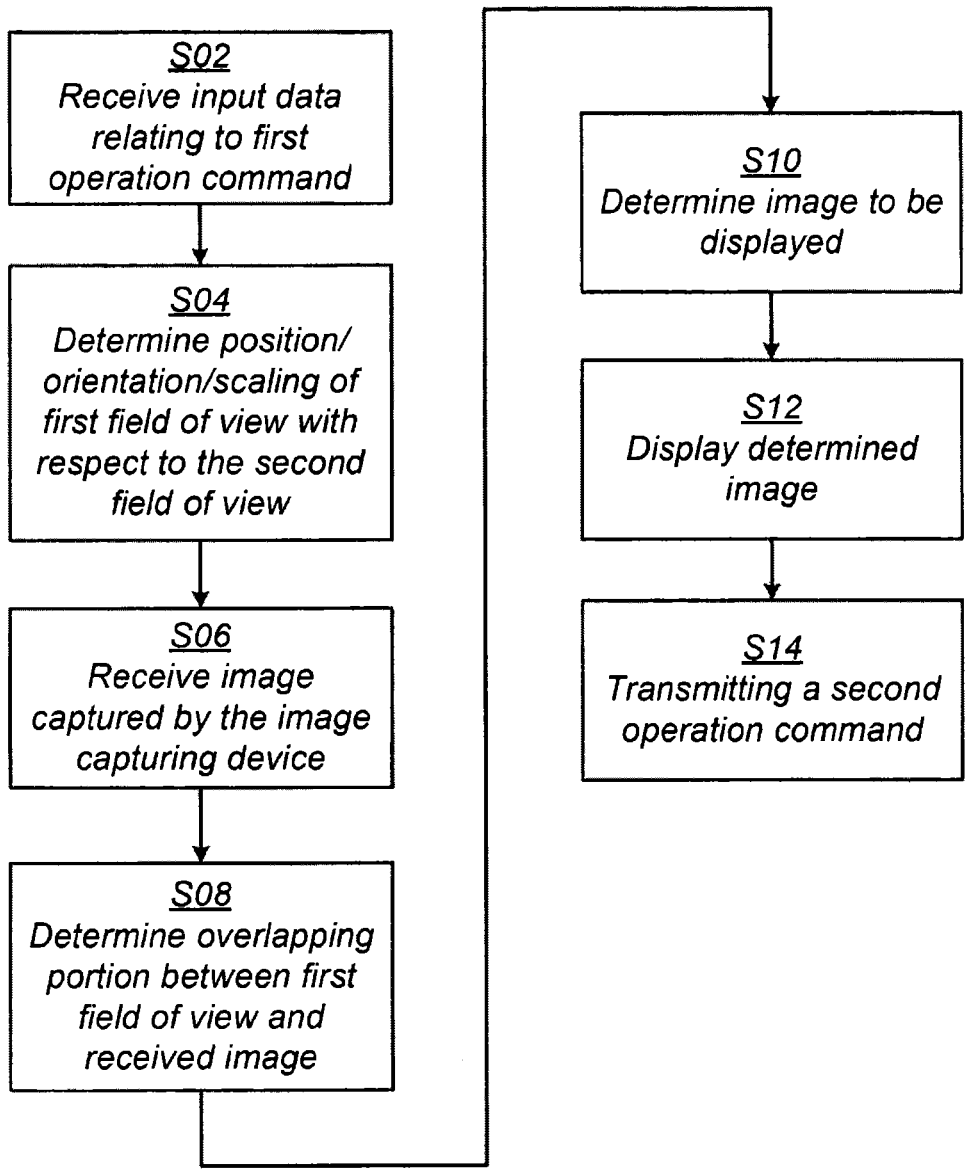
FIG. 6 is a flowchart of a method according to embodiments of the invention.

A method according to an embodiment will be described in the following with reference to FIGS. 1-5 and the flow chart of FIG. 6. The method relates to displaying an image corresponding to a first field of view to an operator of the image capturing device 104.

In step S02, the processing device 102 receives input data from the operation input device 106. The input data relates to a first operation command. In general, the first operation command relates to a change in at least one of a position, an orientation, or a scaling of the first field of view to be shown on the display 108.

In step S04, the processing device 102 determines, based on the input data, at least one of a position, an orientation, or a scaling of the first field of view 302b with respect to the second field of view 300. For example, the position determined in step S04 corresponds to the position P2 of the first field of view 302b of FIG. 3a, to the angle α of FIG. 4a, and the scaling factor K1 disclosed above with reference to FIG. 5a. In case the input data relates to a target position, a target orientation, or a target scaling, the determined position/orientation/scaling is equal to the target position/target orientation/target scaling. In case the input data relates to a movement speed and a movement direction, the position, orientation, and/or scaling may be determined based on the movement speed, the movement direction and the time interval at which images are displayed on the display 108.

In step S06, the processing device 102 receives an image from the image capturing device 104. The processing device 102, may determine at least one of a position, an orientation, or a scaling of the image captured by the image capturing device with respect to the second field of view.

In step S08, the processing device 102 determines an overlapping portion 306 of the first field of view 302b and the image 304b received from the image capturing device 104. The determination of the overlapping portion may comprise determining an offset between at least one of a position, an orientation, or a scaling between the first field of view and the image captured by the image capturing device 104. The offset may hence correspond to an offset in position, e.g. an offset between the center points or any other predetermined points of the first field of view 302b and the received image 304b, and/or an offset in orientation, e.g. an angular offset, and/or an offset in scaling, e.g. an offset in scaling factors. As described above, such determination may be based on metadata received from the image capturing device 104, and/or on a correlation performed between the received image 304b and the image data of the second field of view 300, or by estimating the movement of the image capturing device 104 taking the time delay into account.

Then, in step S10, the processing device 102 determines an image to be displayed by using image data of the image 304b captured by the image capturing device 102 in the overlapping portion 306. The processing device 102 further accesses image data of the second field of view. For example, the processing device 102 may access, from the memory 204, a pre-recorded image covering the whole or parts of the potential field of view of the image capturing device 104. The processing device 102 then uses the accessed image data of the second field of view 300 in the portion 308 of the first field of view falling outside of the overlapping portion. As discussed above with reference to FIGS. 3-5, the relative position, the relative orientation, and/or the relative scaling of the first field of view and the image received from the image capturing device 104 is taken into account when constructing the image to be displayed.

In one embodiment, the step S10 is performed in a number of substeps. In a first substep, a first image is determined as the image data of the second field of view 300 falling inside of the first field of view 302b. Optionally, the first image may be displayed to the operator on the display 108 prior to performing the next substep. In a second substep, the first image is updated in the overlapping portion with image data of the image 304b captured by the image capturing device 104. The updated first image is then displayed to the operator in step S16.

In step S12 the determined image is displayed to the operator.

In step S14, a second operation command related to the first operation command is transmitted to the image capturing device 104. In one embodiment, the second operation command is transmitted by the processing device 102 to the image capturing device 104. In another embodiment, the second operation command is transmitted by the operation input unit 106 to the image capturing device 104.

It will be appreciated that a person skilled in the art can modify the above-described embodiments in many ways and still use the advantages of the invention as shown in the embodiments above. For example, if the main delays are in the image capturing device itself, rather than network transmissions or the processing device, the principles of the invention may be applied locally in the image capturing device. Thus, the invention should not be limited to the shown embodiments but should only be defined by the appended claims.

The invention claimed is:

1. A method for displaying an image corresponding to a first field of view to an operator of an image capturing device having at least one of a pan, a tilt, and a zoom functionality, comprising:

receiving input data relating to a first operation command, the first operation command relating to a change in at least one of a position, an orientation, or a scaling of the first field of view, determining based on the input data at least one of a position, an orientation, or a scaling of the first field of view with respect to a second field of view which is larger than the first field of view, receiving an image captured by the image capturing device, determining an overlapping portion of the first field of view and the image captured by the image capturing device, determining an image to be displayed by:
using image data of the image captured by the image capturing device in the overlapping portion, and, accessing image data of the second field of view and using the image data of the second field of view in a portion of the first field of view falling outside of the overlapping portion, displaying the determined image to the operator, and wherein the image data of the second field of view comprises a pre-recorded image, the method further comprising updating the pre-recorded image using the image captured by the image capturing device.

2. The method of claim 1, wherein the image data of the second field of view has been captured by the image capturing device or by another, separate, image capturing device.

3. The method of claim 1, wherein the image data of the second field of view has been rendered from a geometrical model of a scene.

4. The method of claim 1, further comprising transmitting a second operation command relating to the first operation command to the image capturing device, accessing a time delay relating to latencies in a system for displaying an image to the operator of the image capturing device, and determining the second operation command based on the input data and the time delay.

5. The method of claim 4, wherein the second operation command relates to at least one of a target position, a target orientation, a target scaling of images captured by the image capturing device, or to a movement speed and a movement direction of the image capturing device.

6. The method of claim 1, wherein the image to be displayed has a first field of view and the first operation command relates to at least one of a target position, a target orientation, a target scaling of the first field of view of the image to be displayed, or to a movement speed and a movement direction of the first field of view of the image to be displayed.

7. The method of claim 1, further comprising determining at least one of a position, an orientation, or a scaling of the image captured by the image capturing device with respect to the second field of view.

8. The method of claim 7, wherein the act of determining an overlapping portion of the first field of view and the image captured by the image capturing device comprises determining an offset in at least one of a position, an orientation, or a scaling between the first field of view and the image captured by the image capturing device.

9. The method of claim 8, further comprising receiving information from the image capturing device relating to at least one of the position, the orientation, or the scaling of the image captured by the image capturing device.

10. The method of claim 8, further comprising receiving information relating to a movement speed and a movement direction of the image capturing device, determining at least one of the position, the orientation, or the scaling of the image captured by the image capturing device based on the information relating to the movement speed and the movement direction of the image capturing device.

11. The method of claim 7 wherein the at least one of a position, an orientation, and a scaling of the image captured by the image capturing device with respect to the second field of view is determined by performing a correlation between the image data of the second field of view and the image captured by the image capturing device.

12. The method of claim 1, further comprising updating the image data of the second field of view using the image captured by the image capturing device.

13. A processing device for displaying an image corresponding to a first field of view to an operator of an image capturing device having at least one of a pan, a tilt, and a zoom functionality, the image capturing device being arranged to receive an operation command relating to a first operation command, the processing device comprising:

a memory arranged to store image data of a second field of view, a receiver arranged to receive input data relating to the first operation command, the first operation command relating to a change in at least one of a position, an orientation, or a scaling of the first field of view of the image to be displayed, and to receive an image captured by the image capturing device, a processing unit arranged to determine based on the input data at least one of a position, an orientation, or a scaling of the first field of view with respect to a second field of view which is larger than the first field of view, to determine an overlapping portion of the first field of view and the image captured by the image capturing device, to determine an image to be displayed by: using image data of the image captured by the image capturing device in the overlapping portion, and accessing image data of the second field of view from the memory and using the image data of the second field of view in a portion of the first field of view falling outside of the overlapping portion, and a transmitter arranged to transmit the determined image to a display, wherein the image data of the second field of view comprises a pre-recorded image, the processing unit further being arranged to update the pre-recorded image using the image captured by the image capturing device.

14. A system for displaying an image corresponding to a first field of view to an operator of an image capturing device, comprising:

an operation input device arranged to receive input from the operator relating to a first operation command, the first operation command relating to a change in at least one of a position, an orientation, or a scaling of the first field of view, an image capturing device having at least one of a pan, a tilt, and a zoom functionality, the image capturing device being arranged to receive a second operation command relating to the first operation command, a processing device connected to the operation input device and the image capturing device, thereby being arranged to receive input data relating to the first operation command from the operation input device, and to receive an image captured by the image capturing device, and a display arranged to receive images from the processing device and to present the received images to the operator, wherein said processing device comprising a memory arranged to store image data of a second field of view, a receiver arranged to receive input data relating to the first operation command, the first operation command relating to a change in at least one of a position, an orientation, or a scaling of the first field of view of the image to be displayed, and to receive an image captured by the image capturing device, a processing unit arranged to determine based on the input data at least one of a position, an orientation, or a scaling of the first field of view with respect to a second field of view which is larger than the first field of view, to determine an overlapping portion of the first field of view and the image captured by the image capturing device, to determine an image to be displayed by: using image data of the image captured by the image capturing device in the overlapping portion, and accessing image data of the second field of view from the memory and using the image data of the second field of view in a portion of the first field of view falling outside of the overlapping portion.

15. A non-transitory computer-readable recording medium having recorded thereon a program that when executed by processing circuitry performs a method, said method comprising:

receiving input data relating to a first operation command, the first operation command relating to a change in at least one of a position, an orientation, or a scaling of a first field of view, determining based on the input data at least one of a position, an orientation, or a scaling of the first field of view with respect to a second field of view which is larger than the first field of view, receiving an image captured by an image capturing device, determining an overlapping portion of the first field of view and the image captured by the image capturing device, determining an image to be displayed by:

using image data of the image captured by the image capturing device in the overlapping portion, and, accessing image data of the second field of view and using the image data of the second field of view in a portion of the first field of view falling outside of the overlapping portion, displaying the determined image to an operator, and wherein the image data of the second field of view comprises a pre-recorded image, the method further comprising updating the pre-recorded image using the image captured by the image capturing device.

* * * * *